3,574,644
METHOD OF RENDERING NORMALLY FLAMMABLE MATERIALS FLAME RESISTANT

Franciszek Olstowski, Freeport, and Wallace T. McMichael, John D. Watson, Sr., and Donald W. Pennington, Lake Jackson, Tex., William A. Foster, Midland, Mich., and Edward L. Hill, Littleton, Colo., assignors to The Dow Chemical Company, Midland, Mich.
No Drawing. Filed Mar. 22, 1965, Ser. No. 441,895
Int. Cl. C09d 5/14, 5/16; B28b 9/20
U.S. Cl. 106—15                        5 Claims

ABSTRACT OF THE DISCLOSURE

This invention relates to a process for increasing the flame reistance of flammable materials and to the product produced thereby. Increased flame resistance is achieved by incorporating into a flammable material from about 2 to about 95 weight percent of heat expandable graphite flakes. Upon contact with high temperature, the expandable graphite contained in the flammable material expands to form a tumid refractory insulating layer thereby preventing further combustion.

---

This invention relates to a method of increasing the flame retardance of normally flammable materials and to flame retardant compositions obtained thereby. More particularly, this invention relates to a method for rendering such flammable materials flame resistant and/or flame retardant by use of heat expandable crystalline graphite.

In accordance with the present invention, a particulate, crystalline, heat expandable graphite is incorporated with a normally flammable material in an amount of from about 2 to about 95 weight percent based on the total weight of said graphite and flammable material mixture, thereby rendering said flammable material substantially flame resistant. In those instances in which a localized concentration of the graphite is employed at or near the surface of the flammable material, concentrations of graphite may be employed in the immediate surface area which exceed 95%.

Expandable graphite used in the present composition is prepared from particulate naturally occurring crystalline flake graphite and crystalline lump graphite, flake graphite being preferred. The crystalline graphite is given a particular acid treatment and is then considered to be in the expandable form. The particle size of graphite to be used is not critical although ordinarily particles of from about 10 to about 325 mesh U.S. Standard sieve are used. Generally, about 10–60 mesh is preferred because the expansion ratio of a larger flake is usually greater than that of a smaller flake. Smaller flakes may be desired, however, for homogeniety or for aesthetic purposes.

The term "normally flammable materials" as used herein refers generally to those ordinarily flammable organic materials which are capable of supporting a dispersed particulate graphite, preferably in a substantially uniform dispersion, and which exhibit relatively low vapor pressure when heated.

Generally those organic materials having relatively low kindling points and which are readily combustible such as, for example, greases, petroleum oils, asphalts, asphalt felts, tars, rubbers, wood, wood pulp, latexes, paints, varnishes, lacquers, and other film forming agents or other synthetic and natural polymeric materials such as cellulosics, polyesters, epoxides, polystyrene, polyethylene, polyurethane, polybutylenes, polypropylenes, mixtures of such materials and the like are benefited and rendered flame retardant and/or flame resistant when treated in accordance with the present invention.

When normally flammable materials treated according to the present process are exposed to flame or any other source of temperature of about 150° C. or greater, the graphite present in the normally flammable material rapidly expands to from about 20 to about 200 times or more its unexpanded volume. Thus a tumid refractory portion is produced on the coated surface, thereby effectively retarding propagation of the flame and reducing transfer of heat to the balance of the treated material.

Ordinarily, in accordance with the present invention, the heat expandable graphite is substantially uniformly admixed with or throughout the normally flammable material to be treated, but this is not critical and, in specific instances, a localized concentration of the expanded graphite may be preferred, e.g. on or near the surface of the flammable material.

In practice, the normally non-flammable materials containing heat expandable graphite of the present invention may be applied by any of the conventional techniques ordinarily used for handling and processing such materials such as brushing, spraying, rolling, doctoring, pressing, molding, extruding or the like. The actual method to be used for a given application will depend on the type of material, i.e., its physical form, and its intended use as is well understood to one skilled in the art.

To illustrate, with materials such as waxes, greases, oils, asphalts, tars, or the like, heat expandable graphite may be incorporated therein by simple mixing, or any other desirable method. With normally flammable polymeric materials the graphite usually is admixed with the prepolymer system before polymerization, but may be mixed with the polymer before molding, if desired. When the desired polymeric product is an expanded or foamed material, from about 20 to about 40 weight percent of heat expandable graphite can be incorporated in the material prior to the expansion thereof or may be applied to the surface of the expanded or foamed material by employing a binder or adhesive. If a solid, non-porous product is desired, generally from about 10 to about 20 weight percent of heat expandable graphite (blended into the product) is adequate, but more may be employed if desired.

Further, the expandable graphite can be admixed with a known film-forming coating or paint composition of from about 2 to about 75 percent by weight in an amount preferably of at least about 5 percent by weight expandable graphite based on the solids content of said coating or paint and the resulting admixture applied to a suitable normally flammable surface.

Film-forming coating materials useful in the present invention include, but are not limited to acrylic latexes, vinyl latexes, butadiene-styrene latexes, alkyl paints, epoxy solutions, urethane solutions, varnishes, lacquers, and the like.

Latexes or emulsions or other film-forming coating materials which are unstable to acidic additives may be rendered usable in accordance with the present invention by the addition of basic material, preferably $NH_4OH$, thereto prior to admixture with the expandable graphite. Alternatively, the expandable graphite can be thoroughly wetted with basic material, preferably $NH_4OH$, prior to admixture with the film-forming latex or emulsion. Such basic treatment does not inhibit the intumescence of the graphite material.

Ordinarily, addition of expandable graphite to a film-forming material causes an increase in its viscosity. Depending on the desired means of applying the coating material, the increased viscosity may be adjusted, if necessary, by adding water, solvent or other compatible liquid, depending on the system, to the coating composition.

Expandable graphite coatings of this invention are preferably applied to normally combustible or heat degradable materials such as wood, fiber-board, plastics, insulative ceiling or wall panels, other cellulosic building materials, or the like. However, other advantages, for example, heat insulation, are obtained when coatings of the present invention are applied to noncombustible surfaces such as metals or the like and the graphite is heat-expanded to obtain the vermicular form of the graphite.

As a further illustration of the utility of the present invention, the expandable graphite can be mixed with an aqueous paper slurry in an amount preferably of from about 50 to about 60 weight percent expandable graphite based on the weight of the solids in said slurry. The resulting paper then can be applied to a normally flammable surface or object.

When paper produced in accordance with the present invention is exposed to temperatures in excess of about 150° C., the graphite contained therein expands to produce a thickness of as much as 10 to 40 times its original thickness. When the graphite has expanded, it acts as a thermal insulator, thus not only retarding heat flow, but retarding the propagation of flame.

The expandable graphite impregnated paper of the present invention may be applied, by wrapping or other means, to a body which is normally hot. After application, the paper is ignited, thereby causing the expandable graphite contained therein to expand. Thus, an insulating or flame retardant layer may be provided around a body, such as a steam pipe or other high temperature operating device.

If desired, further improved flame retardation may be obtained by incorporating one or more known organic or inorganic flame retardant compositions into the normally flammable material along with the expandable graphite in accordance with the present invention. Illustrative of the flame retardant compositions employable with expandaed graphite in accordance with the present invention are: organic or inorganic phosphorous or phosphate-containing compounds; organic or inorganic halides, preferably containing chlorine or bromine; antimony-containing compounds; and organic or inorganic formate compositions which yield carbon dioxide by thermal decomposition.

In a manner similar to that described for insulating normally hot bodies, bodies normally cold in operation may be insulated from ambient conditions by applying a layer of the expandable graphite along, in a coating form or in a paper form of the instant invention, to said cold body, and igniting the expandable graphite to form an insulating layer contiguous to said cold body.

In preparing the expandable graphite for the instant invention, a particulate natural crystalline graphite is contacted at about room temperature with (1) a mixture of from about 8 to about 98 weight percent concentrated sulfuric acid (at least about 90 weight percent $H_2SO_4$) and from about 92 to about 2 weight percent concentrated nitric acid (at least about 60 weight percent $HNO_3$), or (2) fuming nitric acid, or (3) fuming sulfuric acid, or (4) concentrated sulfuric acid (at least about 90 weight percent $H_2SO_4$) or concentrated nitric acid (at least about 60 weight percent $HNO_3$), plus at least about 2 weight percent of a solid inorganic oxidizer, such as, for example, manganese dioxide, potassium permanganate, potassium chlorate, chromium trioxide, and the like. The resulting mix components usually are employed on a weight proportion basis of from about 0.2–2/1 (acid member/graphite). These are maintained in contact for at least about one minute, although a contact time of hours or days is not detrimental. The acid treated graphite, now expandable, is separated from any excess acid, washed and dried, if desired.

Alternatively, another method of preparing the expandable graphite used in the method and composition of the present invention is to treat the graphite material with an aqueous peroxy-halo acid, preferably perchloric or periodic acid, using an acid concentration of from about 2 to about 70 weight percent or more and an acid/graphite weight proportion of from about 0.5–2/1, and the acid treated graphite, now expandable, separated from excess acid, and dried, if desired.

The crystalline graphite also can be anodically electrolyzed in an aqueous acidic or aqueous salt electrolyte at an electrolyte temperature of from about 0 to about 80 degrees centigrade at a minimum cell potential of about 2 volts. The total quantity of electricity passed is equivalent to from about 10 to about 500 ampere-hours per pound of graphite. Electrically treated graphite, now expandable is separated from the electrolyte solution.

A better understanding of the present method may be obtained in light of the following examples which are set forth to illustrate, and are not to be construed to limit, the present invention.

For use in the following examples, heat expandable graphite was prepared by mixing about 20 parts by weight of a commercially available Standard Size No. 1 natural graphite flake with about 15 parts by weight of concentrated sulfuric acid and about 10 parts by weight non-concentrated nitric acid. The acid-graphite mixture was stirred at room temperature for about 5 minutes. The graphite flake was then washed free of acid with water.

EXAMPLE I

Ingredients for a rigid polyurethane foam were prepared into two components:

Component A, consisted of 137 grams of toluene diisocyanate-hydroxy propyl glycerine adduct containing 30.6 weight percent of —NCO groups; and Component B, consisting of a polyol (polyether, 1500 centipoise) 91.7 grams, catalyst (triethylene diamine) 0.8 gram, silicone cell control (organosiloxane ethers) 1.5 grams, foaming agent ($CFCl_3$) 35.5 grams.

Using the above components, the following batches were prepared:

Batch 1

Component A (25.8 grams) was mixed with component B (27.5 grams) and the mixture poured into a 1 quart paper carton where the reaction took place and the mixture foamed.

Batch 2

Component A (25.8 grams) was mixed with component B (27.5 grams) and to this mixture was added 20 grams of a natural flake graphite (Standard No. 1). The graphite flake was stirred to uniformly disperse it through the mixture. The graphite-containing mixture was then poured into a one quart paper container where the reaction took place and the mixture foamed.

Batch 3

Component A and component B were mixed in substantially the same manner and amount as in Batch 1 and 20 grams of heat expandable graphite flake (Standard No. 1) prepared as described hereinbefore was admixed therewith. The mixture was poured into a 1 quart paper carton and allowed to foam.

After each of the three batches had cured, a 2 inch thick, 4 inch diameter disk was cut from each foam product and ignited with a flame from a propane-air torch.

The disk from Batch No. 1 burned rapidly and was totally consumed by fire. The disk from Batch No. 2 (containing untreated flake graphite) burned somewhat more slowly but was also thoroughly consumed by the fire leaving a graphite flake skeleton.

When the disk from Batch No. 3 (containing heat expandable graphite) was contacted by the flame from the torch, the graphite flakes expanded leaving a vermicular graphite residue on the surface of the disk beyond which no further burning occurred when the flame was removed from the disk surface. The weight loss due to combustion of this disk was less than 10 percent.

EXAMPLE II

A polyurethane foam was prepared in the manner shown in Example I except that it contained 36 weight percent heat expandable graphite. A segment measuring 4¼ inches in diameter by 1¾ inches in thickness was cut from the block of foam. This segment weighed 19.5 grams and had a bulk density of about 2.7 pounds per cubic foot.

The heat expandable graphite-filled polyurethane foam was held 1 inch above the lighted wick of an alcohol flame for 240 seconds and suffered the loss of only 2.5 grams. The maximum depth of polymer degradation was only 1 inch.

As a control, a sample of commercial self-extinguishing polyurethane foam containing 1.72 percent phosphate was cut into a rectangular block measuring 4¼ inches by 2½ inches by 2 inches. This block weighed 12 grams and had a bulk density of about 2 pounds per cubic foot. The sample of commercial foam was placed 1 inch above the lighted wick of an alcohol lamp for 120 seconds.

After exposure to the alcohol flame for this period, which was ½ that given the heat expandable graphite containing sample, the commercial foam had a loss of 6 grams (50 weight percent) and the depth of polymer degradation was about 1¾ inches.

EXAMPLE III

A number of castings were made using a liquid epoxy resin containing about 10 percent by weight diethylene triamine hardener. These castings were in the form of ½ inch thick by 2 inch diameter disks. The first cast disk (disk No. 1) contained no additives and was used as a control. About 16.5 weight percent natural flake graphite was incorporated into a portion of liquid epoxy resin mix and subsequently was cast as disk No. 2. About 16.5 weight percent heat expandable graphite (prepared as described hereinbefore) was incorporated into another portion of the liquid epoxy resin mix and then was cast into disk No. 3.

After curing, each disk was ignited with a propane torch and, after ignition, the torch was removed. Both disk No. 1 (no additives) and disk No. 2 (natural flake graphite) continued to burn till completely consumed. However, disk No. 3 which contained the heat expandable graphite, extinguished its own flame within 5 seconds the surface becoming coated with a layer of expanded graphite.

EXAMPLE IV

Micro-fine polyethylene powder was mixed with heat expandable graphite in batches containing 50, 25, 10 and 0 weight percent expandable graphite. These samples were molded, then fused at 135° C. to obtain 2-inch diameter disks of about ¼ inch thickness. Each sample was tested for flame retardancy by igniting the disk with a propane torch flame, then removing the flame. The results of these tests were as follows.

| Wt. percent heat expandable graphite: | Results |
|---|---|
| 0 | Completely consumed. |
| 10 | Self-extinguished when graphite expanded. |
| 25 | Do. |
| 50 | Do. |

EXAMPLE V

Expandable polystyrene containing 16.7 weight percent heat expandable graphite and a natural rubber blended with 20 weight percent expandable graphite were also flame tested and found to be self-extinguishing after being ignited with a flame.

EXAMPLE VI

Commercially available water pump grease was prepared for testing, alone and with additives. The first sample contained no additives other than those found in the commercial product. The second sample contained 10 weight percent of untreated natural flake graphite and the third sample contained 10 weight percent of heat expandable graphite. Each sample was placed in a shallow aluminum disk and subjected to 120 seconds contact with the flame from a propane-air torch. The burning greases were allowed to continue burning until the flame extinguished. The residue greases were then weighed to indicate the extent of loss due to burning.

The first sample (10 grams of commercially available water pumped grease) lost 8.5 of an original 10 grams due to burning, while the second sample (containing 10 weight percent of untreated graphite) lost 7.2 of an original 10 grams due to burning. The 10 gram sample containing 10 weight percent of expandable graphite lost only 3 grams due to burning.

EXAMPLE VII

In substantially the manner described in Example VI, a multi-purpose lithium soap grease was blended with untreated graphite and another portion of said soap was blended with heat-expandable graphite. Each sample was subjected to 120 seconds flame contact with a propane torch and allowed to burn until the flame extinguished. A control sample was similarly ignited and allowed to burn.

The control sample of plain grease (containing no graphite) lost 6.5 of an original 10 grams due to burning, and the sample containing 10 weight percent of untreated graphite, lost 6 of an original 10 grams due to burning. The sample of lithium soap grease which contained 10 weight percent expandable graphite lost only 1 of an original 10 grams due to burning.

EXAMPLE VIII

Approximately 15 gram samples were prepared by mixing heat-expandable flake graphite in asphalt at 110° C. and varying concentrations. The asphalt samples were allowed to cool in small aluminum weigh-dishes and were then subjected to 90 second contact with a propane torch flame. An asphalt sample containing no expandable graphite lost 26 weight percent due to flame decomposition. Samples containing 2 and 5 weight percent expandable graphite lost only 2.5 and 0.7 weight percent due to flame decomposition. An asphalt sample containing 10 weight percent of heat-expandable graphite was subjected for 3 minutes to propane flame temperatures. On removing the propane flame, the asphalt flame was immediately self-extinguished.

In a further test, asphalt containing 10 weight percent expandable graphite was compared with asphalt containing no graphite in order to determine the effect of fire spreading. The two samples of asphalt were ignited. The flame thereby produced in the graphite-containing asphalt did not spread, apparently because the flake graphite in the flame area expanded and sorbed the molten asphalt (which was afire). Untreated asphalt when ignited, flowed over a wide area, contributing to the spread of the flames.

EXAMPLE IX

A liquid epoxy resin (39 grams) was blended with asphalt (61 grams) at 70° C. and to this was added 20 grams of a heat-expandable flake graphite. The mass was then poured to form a tough flexible sheet useful as a roof flashing material. Contacting this material with a propane flame showed an excellent flame extinguishing characteristic on removal of the torch. A similar material not containing heat-expandable graphite burned to completion once ignited with the flame.

Another asphalt-epoxy composition was prepared by blending liquid epoxy resin (39 grams) and asphalt (61 grams) at 70° C., and 21 grams of heat-expandable graphite which had previously been wetted by adding 4 grams of concentrated $H_3PO_4$ thereto. After the composition had cured, a sample thereof was ignited by contact with a propane flame. On removal of the propane flame, the asphalt composition immediately extinguished.

EXAMPLE X

A standard commercially available, 15-pound asphalt felt was cut into 9" x 9" squares, each square weighing about 90 grams. One of such squares was coated on both surfaces with graphite flakes having a particle size ranging from 20 to 70 mesh treated with a 50–50 mixture of sulfuric and nitric acids. A very thin layer of 2:1 asphalt-hexane mix was used as an adhesive on the asphalt surface. The graphite flake coating was about 10 percent by weight of the total felt. When the asphalt surfaces were dry, the felt was supported on a 6 inch diameter ring positioned parallel to the horizontal. A large sheet of preweighed aluminum foil was placed below the supported asphalt felt square to catch the dripping tar as the asphalt square underwent combustion.

Ignition of the felt square was performed in the following manner: a small, hand-held propane torch was ignited to yield a 1½ to 2-inch long, pointed flame and was positioned below the asphalt felt so that the hottest point of the flame was in contact with the asphalt at the midpoint of the undersurface of the asphalt-coated felt. The torch flame was maintained in contact with the asphalt felt until the flame burned through the felt and ignited the upper surface. This time is known as the burn-through time. The propane torch was removed at this point and the felt square was allowed to burn until the flame extinguished. After extinction, the amount of tar drip was recorded, and the residue of the felt was weighed and recorded. A high felt residue weight indicates a favorable self-extinguishing characteristic whereas a very low felt residue weight indicates complete combustion of the felt to leave a residue ash. A long burn-through time indicates a more favorable fire retardance.

In another run, particulate calcium carbonate, a known fire resistant coating for asphalt-saturated felt was applied to another asphalt square, ignited and tested in a similar manner as described above.

In a control run, an uncoated asphalt square was also ignited and tested as previously described. Table I below summarizes the results obtained from these runs.

TABLE I

| Felt coating | Wt. percent coating (based on felt) | Burn through time sec. about | Wt. of asphalt drip, gms. | Felt residue wt., gms. |
|---|---|---|---|---|
| (1) 20–70 mesh heat-expandable graphite (natural flake graphite treated with 50–50 $H_2SO_4$-$HNO_3$) | 10 | 150 | 0 | 75 |
| (2) $CaCO_3$ particles (−200 mesh) | 10 | 90 | 11.5 | ¹14 |
| (3) None | 0 | 60 | 21 | ²7 |

¹ Essentially complete combustion.
² Complete combustion.

In studying the above results it is seen that the heat-expandable flake graphite-coated asphalt felts have greatly improved fire retardant properties.

EXAMPLE XI

When other greases, waxes, tars, asphalts, and resins are mixed with heat-expandable graphite in substantial accordance with the methods of Examples I–IX, substantially the same fire retardant property is obtained.

EXAMPLE XII

A series of six test panels was prepared by painting 12" x 12" plywood panels with a commercially available, water-base latex paint formulation containing heat-expandable graphite in varying amounts and having different flake sizes. (The said paint formulation contained 32.7 weight percent pigment and 67.3 weight percent vehicle. Said vehicle contained 20.7 weight percent synthetic rubber and 69.3 weight percent water. When applied to a surface, one hundred grams of wet paint yielded 52.8 grams of dry film.)

Panel number one was painted with a mixture of fifty grams of paint composition and five grams of heat-expandable graphite in large flake form (8 to 20 mesh, U.S. standard sieve series). The mixture thus obtained contained 9.1 weight percent heat-expandable graphite on a wet basis and 15.8 weight percent heat expandable graphite on a dry basis. The painted panel yielded a textured surface.

When dry, the painted surface was briefly exposed to a flame. The painted surface swelled so that the paint film thickness increased from less than 1/32 inch to about 19/32 inch. After intumescence the film was highly porous and its increased volume was substantially occupied by vermicular graphite.

Panel number two was painted with a mixture of fifty grams of latex paint and five grams of modified expandable graphite flake ranging in mesh size from about 20 to about 60 mesh. The dried panel was briefly exposed to a direct flame. On exposure to the flame, the paint coating swelled from a thickness of less than 1/32 inch to a thickness of about 9/32 inch. The coating had an appearance substantially the same as panel one.

Panel number three was painted with a mixture of fifty grams of latex paint and two and one-half grams of heat-expandable graphite flake of the type used in preparing panel number two. The paint contained 4.76 weight percent graphite on a wet basis and 8.6 weight percent graphite on a dry basis. This panel was exposed to a direct flame and the coating expanded to about 10 times its original thickness.

Panel number four was painted with a mixture of forty-five grams of latex paint and 10 grams of heat-expandable graphite flake of the same type used in preparing panels two and three. The dried paint film contained 29.6 weight percent heat-expandable graphite. After flame contact, the painted surface showed about a 10 fold increase in film thickness.

Panel number five was painted with a mixture of forty-five grams of latex paint and five grams of heat-expandable graphite flake ranging in flake size of from about 100 to about 200 mesh. The paint composition thus obtained yielded a dry film containing 17.4 weight percent expandable graphite. This panel also showed an intumescent coating when contacted with flame.

Panel number six (comparative) was painted with a graphite-free coating of latex paint of the type heretofore described and used in preparation of panels one through five.

The six panels were then placed on a horizontal support with the painted surface facing downward. Each panel was subjected to the flame of a standard laboratory alcohol lamp for 60 seconds. The wick of the alcohol lamp was 2 inches beneath the center of the panel. After exposure of all the panels to the alcohol flame, the panels were inspected to determine the area of wood char in order to evaluate the flame retardance of the coating composition.

Observations made of the panels after the alcohol flame test are summarized as follows:

Panel number one

The wood surface was uncharred. The paint surface was slightly darkened over an area of about one square inch.

Panel number two

The wood was slightly charred over an area of less than one square inch.

Panel number three

The wood charred in an area of about one square inch.

Panel number four

No significant wood char.

Panel number five

Approximately 1½ square inches of wood char area.

Panel number six (comparative)

The wood char area was in excess of 6 square inches, and the wood panel had been fully ignited on removing the alcohol lamp.

EXAMPLE XIII

Flame resistant coating compositions in accordance with the present invention can be prepared substantially as shown in Example XII by substituting acrylic latexes, vinyl latex, alkyl paints, epoxy solutions, urethane solutions, varnishes, or lacquers for the synthetic rubber latex employed therein. These compositions, when applied as coatings on flammable substrates effectively form tumid coatings when contacted with a flame and substantially increase the fire retardancy of the substrate.

EXAMPLE XIV

Heat-expandable graphite in an amount of about 5 grams was added to an aqueous paper slurry containing 2.5 grams fiber. The slurry-graphite mixture was made into a sheet and dried in accordance with paper making techniques.

A strip of the paper thus produced was wrapped around a metal pipe of the type used to carry steam so as to completely cover the outer surface thereof. The paper was heated by the hot pipe and an expanded, thermal insulating layer was formed over the entire outer surface of the pipe.

Various modifications may be made in the present invention without departing from the spirit or scope thereof, and it is to be understood that we limit ourselves only as defined in the appended claims.

We claim:

1. A flame resistant composition which comprises a flammable material capable of supporting particulate graphite containing therein from about 2 to about 95 weight percent of heat-expandable particulate graphite prepared by contacting a particulate naturally-occurring crystalline flake or crystalline lump graphite with a member selected from (a) a mixture of from about 8 to about 98 weight percent concentrated sulfuric acid and from about 92 to about 2 weight percent concentrated nitric acid (b) fuming nitric acid, (c) fuming sulfuric acid and (d) an aqueous solution of a peroxyhalo acid containing from about 2 to about 70 weight percent of said acid.

2. The composition of claim 1 wherein the normally flammable material is a flammable film-forming coating.

3. The composition of claim 1 wherein the flammable material is a member selected from the group consisting of greases, tars, asphalts, and asphaltic felts.

4. The composition of claim 1 wherein the flammable material is a member selected from the group consisting of celluloses, polyesters, polystyrenes, polyurethanes, polybutylenes, polypropylenes, polyethylenes and epoxy resins.

5. The composition of claim 2 wherein the flammable film-forming coating is a member selected from the group consisting of latexes, paints, varnishes, and laquers.

References Cited

UNITED STATES PATENTS

| | | | |
|---|---|---|---|
| 1,137,373 | 4/1915 | Aylsworth | 252—311 |
| 3,084,172 | 4/1963 | Larsen | 252—316 |
| 3,294,702 | 12/1966 | Larsen | 260—348 |
| 3,323,869 | 6/1967 | Olstowski | 204—130 |

DONALD J. ARNOLD, Primary Examiner

J. B. EVANS, Assistant Examiner

U.S. Cl. X.R.

23—209.1; 106—16, 38.25, 38.8, 217, 261, 280, 281, 307; 117—137; 162—159; 252—8.1; 260—41, 45.7